Patented Apr. 12, 1932

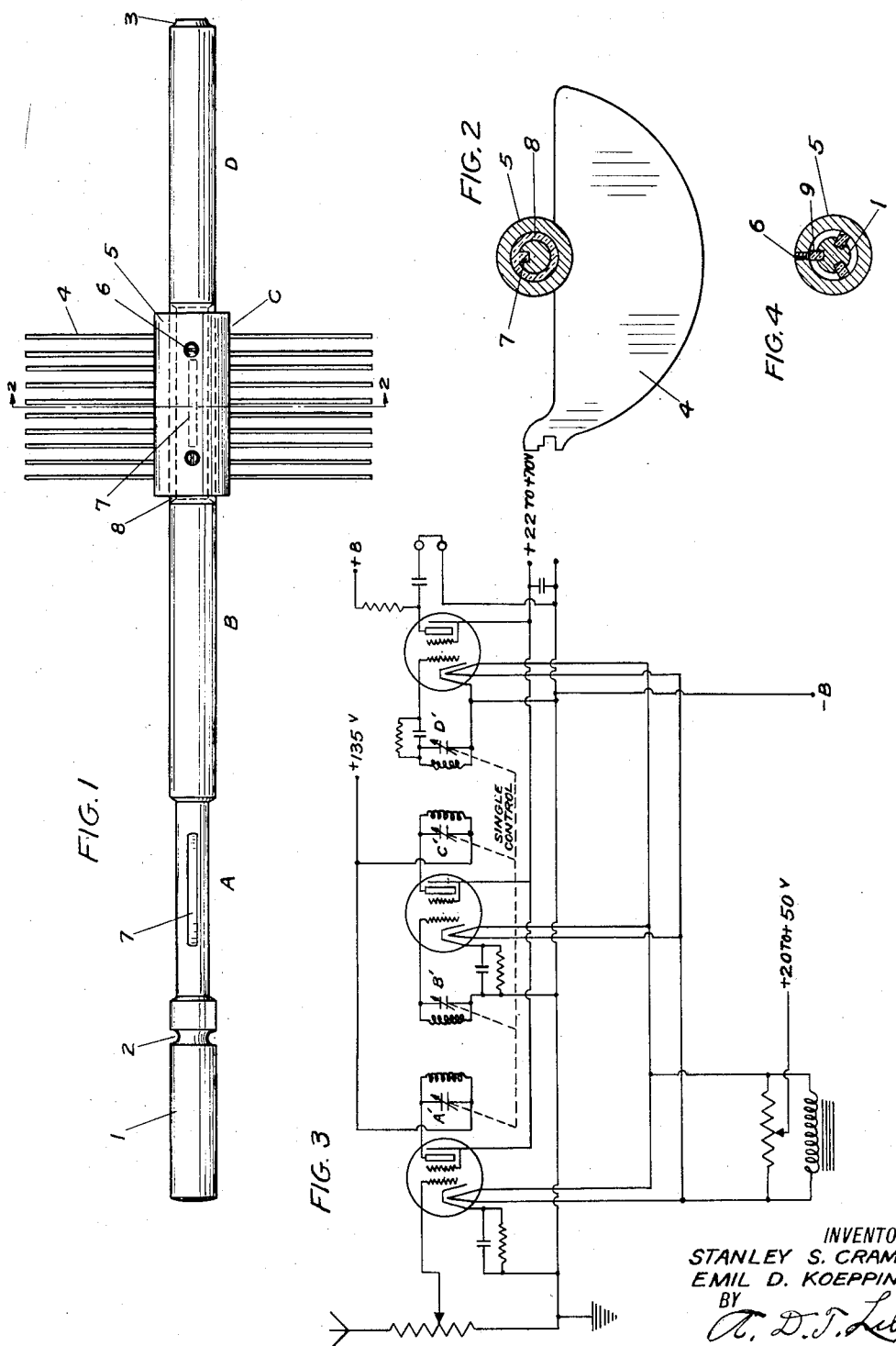

1,853,664

UNITED STATES PATENT OFFICE

STANLEY S. CRAMER AND EMIL D. KOEPPING, OF HADDON HEIGHTS, NEW JERSEY, ASSIGNORS TO RADIO CONDENSER COMPANY, OF CAMDEN, NEW JERSEY

ROTOR SHAFT FOR ELECTRICAL CONDENSERS

Application filed April 12, 1929. Serial No. 354,468.

This invention relates to improvements in the construction of electrical condensers of the type especially adapted for use in radio receiving sets. In such receiving sets, it is now customary to use several tuning condensers mounted as a unitary structure for operation or control by a single means, such as a dial or knob. In such gang condensers so called, the rotors are usually mounted all on one shaft and if used in a receiving circuit, the rotors are connected to the ground side of the circuit.

However, in special receiving circuits, it may be necessary to insulate both the stators and the rotors, or at least that part of them comprising the main condenser, but this is not always an easy matter to do, and it is the object of our invention to provide a simple and rather inexpensive way of insulating any one or all of the rotors which are mounted on a common shaft serving the so-called gang condenser.

Our invention will be readily understood by reference to the annexed drawings, wherein:

Figure 1 is a view of a shaft suitable for use in a four-gang condenser, but showing only one of the rotor groups of plates in position but insulated from the shaft.

Figure 2 is a section on the line 2—2 of Figure 1.

Figure 3 is a view of a circuit which is the invention of Emil D. Koepping, wherein a gang condenser using the shaft shown in Figure 1, is adapted for use.

Figure 4 is a sectional view through the rotor sleeve, but showing a modified form of insulating the sleeve from the shaft and at the same time reducing the surface leakage.

In the drawings, the shaft as shown in Figure 1, is a shaft suitable for a four-gang condenser such as illustrated in Patent 1,800,719, issued April 14, 1931, Stanley S. Cramer. This shaft 1 has ball races 2 and 3 formed therein for anti-friction bearings, all as described in the said Cramer patent. The shaft is divided into spaces or sections A, B, C, and D, on which sections are carried the rotor groups of plates. These rotor plates 4 are mounted on a metallic sleeve 5 which is adapted to slide over the shaft 1 in the various sections to its position, where it is anchored by any suitable means as by set screws 6. One or more of the sections, in this case sections A an C, are turned down so as to have a diameter less than the full diameter of the shaft 1, and these reduced sections are provided with some anchor means such as a slot 7.

After the shaft has been made as above outlined, it is then placed in a mould, and sections A and C which have been reduced in diameter, are moulded full of a suitable insulating material which enters the slot 7 or embraces any equivalent anchor means whereby the insulation is prevented from turning around on the shaft. The wall of the insulating material 8 is of sufficient thickness so that the set screw 6 may be firmly set up without danger of cracking the insulation.

Where the rotor sleeve 5 is insulated from the shaft 1 in the manner explained, it is of course necessary to connect a pigtail or other suitable means to the sleeve, so as to connect the rotor of the individual condenser into the circuit in the proper manner.

We have shown in Figure 3, a circuit which is adapted to use a gang condenser having a group of rotors arranged on the shaft shown in Figure 1, but since the circuit per se forms no part of our present invention, it will not be described herein, except to point out that the condensers marked A' and C' in Figure 3, must have the stator and rotor of each insulated from the corresponding parts forming condensers B' and D', and therefore a gang condenser having the rotors mounted on sections A and C insulated from the shaft 1 as explained while the other rotors are mounted directly on the metallic parts B and D of the shaft which are not cut away, provides an arrangement suitable for use in a circuit such as shown in Figure 3.

It may be noted, however, that the circuit arrangement of Figure 3 is such that there is required less capacity in the condenser circuits A' and C', than in condenser circuits B' and D', and this difference in capacity is considerably in excess of the amount that can be gained by any ordinary capacity compensation or curve correction means. Therefore, the rotor groups on the shaft 1 and their associated stators may be, and in the cases mentioned are, substantially different in capacity one from the other so as to meet the circuit requirements.

It is to be understood that any one or all of the sections, A, B, C, and D, may be arranged with insulation the same as proposed for sections A and C, according to the circuit requirements. Our design of shaft makes it easily possible to make a gang condenser having all the stators and rotors insulated each from the other, or any one or all of the stators may be mounted directly on metal, thereby grounding them to the frame which is usually connected to the circuit ground, in which case the corresponding rotor would be insulated as has been pointed out.

Our invention is susceptible of certain variations as is shown in Figure 4, wherein the sleeve 5 is supported by three strips of insulation 9 forced into cooperating keyways similar to keyway 7, which preferably are equal to the length of the rotor sleeve. In this case, the set screws 6 engage one of the insulators 9 which are of substantial material to take and sustain the pressure of the screw. By mounting the rotor sleeves in this way, the capacity action between the sleeve and the shaft due to the dielectric therebetween is materially reduced. Other details may be varied without departing from the spirit of our invention or the scope of the appended claims.

Having thus described our invention, what we claim is:

1. A rotor shaft for an electrical condenser comprising; a metallic rod having spaced sections adapted to receive sleeves carrying groups of rotor plates, at least one of said sections being reduced in diameter and having a slot cut therein and insulation then moulded over said reduced diameter portion and into the slot to the full diameter of the shaft, whereby a rotor sleeve with its plates may be slipped thereon and anchored to the insulation.

2. A rotor shaft for an electrical condenser comprising; a metallic rod having spaced sections adapted to receive sleeves carrying groups of rotor plates, at least one of said sections being reduced in diameter and having anchor means constructed thereon and insulation moulded over said reduced portion and anchor means, to substantially the full diameter of the shaft whereby a rotor sleeve with its plates may be slipped thereon and anchored to the insulation.

3. A rotor shaft for an electrical condenser comprising; a metallic rod having spaced sections adapted to receive sleeves carrying groups of rotor plates, a plurality of said sections being reduced in diameter and each having anchor means constructed thereon and insulation moulded over said reduced portions and anchor means to substantially the full diameter of the shaft whereby rotor sleeves with their plates may be slipped over the insulated sections and fastened to the insulation.

4. A rotor shaft for an electrical condenser comprising; a metallic rod having spaced sections adapted to receive sleeves carrying groups of rotor plates, at least one of said sections having anchor means constructed thereon and insulation moulded thereover to receive said sleeve carrying rotor plates and fastening means to anchor said sleeve to the insulation.

5. A rotor shaft for an electrical condenser comprising; a metallic rod having spaced sections adapted to receive sleeves carrying groups of rotor plates, a plurality of keyways cut in said shaft sections, insulating strips set in said keyways, said strips extending outwardly from the shaft to receive a rotor sleeve thereon, and means carried by the sleeve to fasten it to at least one of said strips.

6. A rotor shaft for an electrical condenser comprising; a metallic rod having spaced sections adapted to receive sleeves carrying groups of rotor plates, means for mounting said rotor groups on said shaft sections and at the same time reduce the surface leakage, consisting of a plurality of spaced insulators carried by said shaft so as to support said rotor sleeves.

7. A rotor shaft for an electrical condenser comprising; a metallic rod having spaced sections adapted to receive sleeves carrying groups of rotor plates, means for mounting said rotor groups on said shaft sections and at the same time reduce the surface leakage, consisting of a plurality of arcuately spaced insulators carried by the shaft and having a length substantially the same as the rotor sleeve, but relatively narrow, whereby the area of sleeve contact therewith is small.

8. An electrical condenser including; a metallic shaft having sections adapted to receive sleeves carrying groups of rotor plates for forming with their stators, condensers of selected capacity, said shaft having special anchor means fixedly positioned at selected sections, and insulating means for the rotor sleeves at said sections, said insulating means cooperating with said anchor means to hold said insulating means from turning on the shaft, and clamping screw means for securely fastening the said rotor sleeves to the insulating means.

In testimony whereof, we affix our signatures.

STANLEY S. CRAMER.
E. D. KOEPPING.